United States Patent [19]

Lockhart et al.

[11] Patent Number: 5,131,469
[45] Date of Patent: Jul. 21, 1992

[54] GELLABLE AQUEOUS COMPOSITIONS AND ITS USE IN ENHANCED PETROLEUM RECOVERY

[75] Inventors: Thomas P. Lockhart; Giovanni Burrafato, both of Milan, Italy

[73] Assignees: Eniricerche S.p.A.; AGIP S.p.A., Milan, Italy

[21] Appl. No.: 751,630

[22] Filed: Aug. 26, 1991

Related U.S. Application Data

[63] Continuation of Ser. No. 499,819, Mar. 27, 1990, abandoned.

[30] Foreign Application Priority Data

Mar. 31, 1989 [IT] Italy ................................ 19967 A/89

[51] Int. Cl.$^5$ .......................................... E21B 35/138
[52] U.S. Cl. ..................................... 166/295; 166/270; 166/300; 252/8.551; 523/130
[58] Field of Search ...................... 166/271, 305.1, 270, 166/295, 305.1, 307, 308; 523/130, 131, 132; 252/8.551

[56] References Cited

U.S. PATENT DOCUMENTS

| | | | |
|---|---|---|---|
| 3,978,928 | 9/1976 | Clampitt | 166/294 |
| 4,606,407 | 8/1986 | Shu | 166/270 |
| 4,657,081 | 4/1987 | Hodge | 252/8.551 X |
| 4,706,754 | 11/1987 | Smith | 523/130 X |
| 4,722,397 | 2/1988 | Sydansk et al. | 166/295 |
| 4,723,605 | 2/1988 | Sydansk | 166/295 |
| 4,917,186 | 4/1990 | Mumallah | 166/270 X |

FOREIGN PATENT DOCUMENTS 218773 9/1987 United Kingdom .

OTHER PUBLICATIONS

Lockhart, Spe Internat. Symp. On Oilfield Chem., Paper No. Spe 20998, Anaheim, Calif., Feb. 20–22, 1991.

Primary Examiner—George A. Suchfield
Attorney, Agent, or Firm—Oblon, Spivak, McClelland, Maier & Neustadt

[57] ABSTRACT

A gellable aqueous compositions able to reduce the permeability of high-permeability zones in an oil reservoir is a aqueous solution containing metered quantities of:
a) a water-soluble organic polymer cross-linkable by the effect of a polyvalent metal ion cross-linking agent;
b) a Cr(III) ion cross-linking agent; and
c) a ligand for the cross-linking agent chosen from water-soluble organic alpha-hydroxy acids and alpha-amino acids.

10 Claims, No Drawings

GELLABLE AQUEOUS COMPOSITIONS AND ITS USE IN ENHANCED PETROLEUM RECOVERY

The present application is a continuation of application Ser. No. 499,819, filed Mar. 27, 1990, now abandoned.

This invention relates to a gellable aqueous composition with delayed gelling, which is able to reduce the permeability of high-permeability zones in an oil reservoir. The invention also relates to a method for reducing permeability in a reservoir using said gellable composition.

The primary recovery methods for petroleum, make use of the natural energy of the reservoir or mechanical means to produce petroleum from the reservoir through the wells; however, these methods are known to allow only partial extraction of the crude contained in an oil reservoir. To increase the extractable petroleum quantity it is therefore usual to employ secondary recovery techniques, consisting essentially of introducing into the reservoir through selected injection wells a fluid, generally water or an aqueous polymer solution, which conveys the crude through the pores in the rock to producing wells. However, because of the non-homogeneous state of petroleum-bearing rock, which results in zones of different permeability, the injected fluid tends to be channelled through the zones of greater permeability. As a consequence, the zones of lower permeability or only partly are not flushed, by the injected fluid, which limits the total quantity of petroleum recovered from the reservoir.

To solve this problem, use can be made of one of the techniques for enhanced petroleum recovery based on the partial or complete occlusion of the high permeability, watered-out zones. This is accomplished by feeding an aqueous solution of a gellable polymer into the reservoir through one or more wells, to form polymer gels in situ in the high permeability zones. In this manner it is possible to deviate the flow of fluids subsequently introduced into the reservoir towards the zones of lower permeability and thus recover the crude contained in them.

The gellable solutions used for this purpose are normally an aqueous solution of a water-soluble polymer such as a polyacrylamide, a partly hydrolyzed polyacrylamide, or a biopolymer such as xanthan gum, cross-linkable by the effect of an ion of a polyvalent metal, normally Cr(III). Moreover, as the zones to be occluded can be very large and/or at a more or less great distance from the injection well, the gelling solution must be of delayed gelling type to allow the solution to reach the high permeability zones of the reservoir and to fill them completely. The problem of delayed gelling has been confronted in various ways. Thus, in one known method described for example in U.S. Pat. No. 3,785,437, an aqueous solution containing the cross-linkable polymer and a hexavalent chromium salt unable in itself to cross-link the polymer is injected into the reservoir. The chromium is then reduced to the trivalent state at a slow rate by means of a reducing agent (such as thiourea or bisulphite) either contained in the gellable solution or injected into the reservoir in the form of an aqueous solution subsequent to the injection of the gellable solution, so as to induce gelling. This Cr(VI)/reductant method, which has the advantage of permitting the injection of a single, slow gelling solution into the reservoir, has however the drawback of toxicity of hexavalent chromium and its consequent impact on the environment.

In the case of sequential injection, the drawbacks include the incomplete mixing of the injected solutions, so that the gel forms only at their interface, and is therefore thin and easily deteriorates. U.S. Pat. No. 3,762,476 describes a gellable composition useful for correcting permeability in an underground reservoir, which comprises a cross-linkable polymer and a cross-linking agent in the form of an ion of a polyvalent metal complexed with certain anions having sequestering and delaying characteristics. According to the description of this patent, the solution of the complexed cross-linking agent is injected into the reservoir after injecting the polymeric aqueous solution, and thus the aforesaid drawbacks inherent in sequential injection are not overcome.

U.S. Pat. No. 4,683,949 describes gellable aqueous compositions useful in petroleum enhanced recovery methods which contain a water-soluble polyacrylamide and a cross-linking agent in the form of a Cr(III) complex with a carboxylate ion, and more particularly an aliphatic monocarboxylic acid ion, especially an acetate ion. The use of this composition avoids the problems relative to sequential injection, however the resultant delay in cross-linking is only modest. Consequently these compositions are unsuitable for positioning the gel in deep zones in the reservoir, as is often desired.

It has now been found that the aforesaid drawbacks can be obviated by the gellable compositions of the present invention, which use particular ligands for the cross-linking agent and have gelling delay times which can be adjusted within a wide range of values useful for practical purposes. Moreover, such compositions are able to undergo transformation into a compact gel at ambient or higher temperature, so being very useful in petroleum assisted recovery methods in which the permeability values within the reservoir are corrected.

In accordance therewith, one object of the present invention is the provision of a gellable aqueous composition with an adjustable gelling delay time.

A further object of the present invention is the use of such a composition in petroleum assisted recovery methods. Further objects of the invention will be apparent from the ensuing description and experimental examples.

Thus, according to one aspect, the present invention provides a gellable aqueous composition able to reduce the permeability of high-permeability zones in an oil reservoir, which is in the form of an aqueous solution comprising:
 a) a water-soluble organic polymer cross-linkable by the effect of a polyvalent metal ion cross-linking agent;
 b) a Cr(III) ion cross-linking agent;
 c) a ligand for the cross-linking agent chosen from water-soluble organic alpha-hydroxy acids and alpha-amino acids;

the component a) being present in a quantity of between 1000 and 50,000 ppm; the component b) being present in a quantity of between 10 and 5000 ppm; the weight ratio of component a) to component b) varying from 1:1 to 1000:1; the component c) being present in a quantity of between 0.5 and 500 moles per gram atom of component b); the composition having a pH equal to or less than about 7.0.

In the present description, ppm means parts per million by weight. Water-soluble polymers useful for the purposes of the present invention are water-soluble biopolymers and synthetic polymers of high molecular weight able to gel in the presence of the cross-linking agent within the cross-linking pH range (pH between about 2.0 and 7.0). The biopolymers comprise polysaccharides and modified polysaccharides. Examples of biopolymers are xanthan gum, guar gum, carboxymethyl cellulose, hydroxyethyl cellulose, hydroxypropyl cellulose and modified starches. Synthetic polymers useful for the purpose include acrylamide polymers such as polyacrylamide, partially hydrolyzed polyacrylamide and the copolymers of acrylamide with one or more copolymerizable monomers. The weight average molecular weight of these polymers and copolymers can generally vary from 100,000 to 20,000,000 and their concentration in the composition can vary from 1000 to 50,000 ppm.

In the preferred embodiment, polyacrylamide polymers or their partial hydrolysis products with a weight average molecular weight of between 200,000 and 12,000,000 can be used, in a concentration varying from 4000 to 30,000 ppm.

The cross-linking agent useful for the purposes of the present invention is the Cr(III) ion and therefore the water-soluble organic salts of this metal such as the chloride, nitrate or sulphate are used. The concentration of the cross-linking agent in the composition, expressed as metal, can vary between 10 and 5000 ppm and preferably between 25 and 500 ppm.

The weight ratio of the water-soluble organic polymer to the cross-linking agent is kept between 1:1 and 1.000:1, and preferably between 5:1 and 500:1.

The ligands for the cross-linking agent useful for the purposes of the present invention are chosen from the water-soluble organic alpha-hydroxy acids and alpha-amino acids, definable by the general formula:

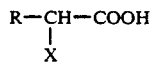

where:
R represents a hydrogen atom or a linear or branched alkyl group containing from 1 to 15 carbon atoms (preferably 1 to 5 carbon atoms), a cycloalkyl group or an aryl group; and
X represents the hydroxyl group or amino group.

Examples of such ligands are glycolic acid, lactic acid, glycine, serine and 2-aminobutyric acid. These ligands can be added to the gellable aqueous composition as salts, especially salts with an alkaline metal or ammonium.

In the composition of the present invention the Cr(III) ligand and the cross-linking agent can be present in a molar ratio of between 0.5:1 and 500:1, and preferably between 5:1 and 100:1. In addition, the composition of the present invention has a pH within the composition gelling range, which generally is between about 2.0 to 7.0. Consequently, when necessary or desirable, the pH value of the composition is adjusted by adding a mineral acid such as hydrochloric acid or perchloric acid, or an inorganic base such as sodium hydroxide. A neutral or acid pH is essential for inducing gelling of the gellable compositions of the present invention. In this respect, at alkaline pH values colloidal chromium hydroxide precipitates, this being inactive for cross-linking purposes.

Although the mechanism by which the ligands of the present invention exercise their delaying effect on the gelling rate of the gels cross-linked by Cr(III) is not known with certainty, it is considered that this effect depends on the chemistry of their complexing with the Cr(III) in solution. In particular, it is considered that in the complexed or sequestered form, i.e. Cr(III)-L (L=ligand), the Cr(III) is not available for reaction with the reactive carboxylic acid groups of the polymer chain, and therefore no gelling occurs. In accordance with this theory, the Cr(III) becomes available for cross-linking only when the ligand L dissociates, as represented by the following equation:

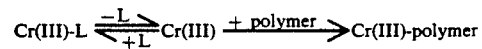

Basically, this implies that the rate of cross-linking depends strongly on the concentration and chemical nature of the particular ligand added to the gellable composition. While certain ligands, in particular those described in the present invention, are effective, others will be much less so, depending on the rate at which they release the Cr(III) for cross-linking purposes. In this context it should be noted that the acetate ion is a weak complexing agent for Cr(III) [in this respect see Irving H.N.M.H. "The XVth Proctor Memorial Lecture. Fact or Fiction? How Much Do We Really Know About the Chemistry of Chronium Today?", J. Soc. Leather Techn. Chemists (1974) 58, 51] and is therefore not effective in obtaining long delays in gelling at high temperature. As according to this mechanism the effect obtained by adding the ligand L is due to the formation of the complex Cr(III)-L, the invention can be implemented either by mixing the components in solution (as described in the following examples) or by using preformed complexes. In this latter case, the complexes could be used either with or without excess ligand in solution.

According to a further aspect, the present invention provides a gelling method in which the gellable aqueous solution is injected into the oil reservoir and penetrates substantially into that zone of the reservoir to be treated, before undergoing gelling.

This method therefore comprises:
preparing the aforesaid gellable composition on the surface under controlled conditions;
injecting this prepared composition into the oil reservoir through at least one well;
moving the composition through the reservoir until it reaches and substantially fills the high-permeability zone to be treated; and
gelling the composition in situ with consequent lowering of the permeability of said high-permeability zone.

The gellable aqueous composition is prepared by simply mixing the constituents, operating under ambient temperature conditions. The order of addition of the constituents is not particularly critical, however in a preferred embodiment an aqueous solution of the water-soluble organic polymer and ligand is firstly prepared, to which the solution of cross-linking agent is then added. Finally, if necessary or desired, the pH is adjusted by adding a mineral acid or an inorganic base.

As will be apparent from the experimental examples given hereinafter, the use of the alpha-hydroxy acid or alpha-amino acid ligand delays gelling by a time adjustable within a wide range of values, particularly as a function of the ratio of ligand to cross-linking agent. Moreover, gelling occurs both at ambient temperature and at higher than ambient temperature, with the production of stable, compact gels. It is therefore possible to prepare gellable aqueous solutions suitable for the most diverse conditions which can be encountered in an oil reservoir. In the following experimental examples, given by way of non-limiting illustration, the following general procedure is used. Two separate solutions in deionized water are prepared, containing respectively 10,000 ppm of a commercial polyacrylamide (1% hydrolysis, weight average molecular weight 5,000,000–6,000,000) and 1000 ppm ($1.9 \times 10^{-2}$M) of Cr(III) in the form of Cr(III) nitrate or chloride. Aliquots of these solutions are mixed together to obtain a final polyacrylamide concentration of 8,000 ppm, a final Cr(III) concentration of 50 ppm and variable quantities of ligand with molar Cr(III)/ligand ratios between 0.5:1 and 50:1. The solution pH is adjusted to $5.5 \pm 0.2$ by the addition of an aqueous sodium hydroxide or hydrochloric acid solution as required. Equal samples of each solution are prepared in order to follow the gelling progress at 25, 60 and in some cases 85° C.

EXAMPLE 1

Glycolic acid is used as ligand (L) in various molar ratios to the Cr(III), the time in days being measured for complete gelling of the solution to occur at the various temperatures indicated. The test results are given below.

| Molar ratio | Gelling time (days) | | |
|---|---|---|---|
| L/Cr(III) | 25° C. | 60° C. | 85° C. |
| 1:1 | 1 | <0.5 | <0.5 |
| 5:1 | 8 | 6 | 1 |
| 10:1 | 32 | 66 | 2 |
| 50:1 | (*) | (*) | 7 |

(*) not yet gelled after 72 days

EXAMPLE 2

Lactic acid is used as ligand (L) in various molar ratios to the Cr(III), the time in days being measured for complete gelling of the solution to occur at the various temperatures indicated. The test results are given below.

| Molar ratio | Gelling time (days) | | |
|---|---|---|---|
| L/Cr(III) | 25° C. | 60° C. | 85° C. |
| 1:1 | 1 | 1 | 1 |
| 5:1 | 3 | 1 | 1 |
| 10:1 | 5 | 19 | 1 |
| 25:1 | (*) | 47 | 1 |
| 50:1 | (*) | 66 | 6 |

(*) not yet gelled after 72 days

EXAMPLE 3

Glycine is used as ligand (L) in various molar ratios to the Cr(III), the time in days being measured for complete gelling of the solution to occur at the various temperatures indicated. The test results are given below.

| Molar ratio | Gelling time (days) | | |
|---|---|---|---|
| L/Cr(III) | 25° C. | 60° C. | 85° C. |
| 0.5:1 | 1 | 1 | 1 |
| 2:1 | 1 | 1 | 1 |
| 5:1 | 3 | 1 | 1 |
| 10:1 | 9 | 1 | 1 |

EXAMPLE 4

Serine is used as ligand (L) in various molar ratios to the Cr(III), the time in days being measured for complete gelling of the solution to occur at the various temperatures indicated. The test results are given below.

| Molar ratio | Gelling time (days) | |
|---|---|---|
| L/Cr(III) | 25° C. | 60° C. |
| 1:1 | 1 | 1 |
| 5:1 | 4 | 1 |
| 10:1 | (*) | 1 |
| 25:1 | (*) | 16 |

(*) not yet gelled after 62 days

EXAMPLE 5

2-aminobutyric acid is used as ligand (L) in various molar ratios to the Cr(III), the time in days being measured for complete gelling of the solution to occur at the various temperatures indicated. The test results are given below.

| Molar ratio | Gelling time (days) | |
|---|---|---|
| L/Cr(III) | 25° C. | 60° C. |
| 1:1 | 1 | 1 |
| 5:1 | 2 | 1 |
| 10:1 | 6 | 1 |
| 25:1 | (*) | 6 |

(*) not yet gelled after 68 days

EXAMPLE 6 (COMPARISON)

Acetic acid is used as ligand (L) in various molar ratios to the Cr(III), the time in days being measured for complete gelling of the solution to occur at the various temperatures indicated. The test results are given below.

| Molar ratio | Gelling time (days) | | |
|---|---|---|---|
| L/Cr(III) | 25° C. | 60° C. | 85° C. |
| 1:1 | 1 | <0.5 | <0.5 |
| 10:1 | 4 | <0.5 | <0.5 |
| 50:1 | (*) | 11 | 3 |

(*) not yet gelled after 43 days

EXAMPLE 7

Three gelling tests are carried out using glycolic acid as ligand with a molar ligand/Cr(III) ratio of 5/1 at different pH values. The results are given in the following table. Tests 2 and 3 are comparison tests.

| Test | pH | Gelling time (days) | |
|---|---|---|---|
| | | 25° C. | 60° C. |
| 1 | 5.5 | 6 | 6 |

-continued

| Test | pH | Gelling time (days) | |
|---|---|---|---|
| | | 25° C. | 60° C. |
| 2 | 9.5 | (*) | (*) |
| 3 | 9.5 | (*) | (*) |

(*) no gelling after 50 days; all samples are turbid due to the presence of colloidal chromium hydroxide.

In test 2 the pH value is adjusted after mixing all the reagents together. In test 3 the pH value is adjusted to 9.0 after mixing the polymer solution and ligand solution together but before adding the Cr(III). After adding the Cr(III) the pH is adjusted to 9.5.

EXAMPLE 8

Three gelling tests are carried out using lactic acid as ligand with a molar ligand/Cr(III) ratio of 5/1 at different pH values. The results are given in the following table. Tests 2 and 3 are comparison tests.

| Test | pH | Gelling time (days) | |
|---|---|---|---|
| | | 25° C. | 60° C. |
| 1 | 5.5 | 5 | 19 |
| 2 | 9.5 | (*) | (*) |
| 3 | 9.5 | (*) | (*) |

(*) no gelling after 50 days; all samples are turbid due to the presence of colloidal chromium hydroxide.

The pH was adjusted in tests 2 and 3 as in Example 7.

In the comparison examples the presence of Cr(OH)$_3$.3H$_2$O, a substance of very low water solubility, can be noted. The determination can be made by turbidity measurements on the aqueous solutions, even in the presence of the water-soluble polymers. Under these conditions, the ligand is evidently inactive towards the chromium, and this latter is inactive in cross-linking the polymer solutions.

We claim:

1. A gellable aqueous composition able to reduce the permeability of high-permeability zones in an oil reservoir, characterized by being in the form of an aqueous solution comprising:
   a) a water-soluble organic polymer selected from the group consisting of polyacrylamide, partially hydrolyzed polyacrylamide and acrylamide polymers with one or more copolymerizable monomers, cross-linkable by the effect of a polyvalent metal ion cross-linking agent;
   b) a Cr(III) ion cross-linking agent;
   c) a ligand chosen from those defined by the general formula:

$$R-CH-COOH$$
$$|$$
$$X$$

where: R represents a hydrogen atom, a linear or branched alkyl group containing from 1 to 15 carbon atoms, a cycloalkyl group or an aryl group, and X represents a hydroxyl group or amino group; the component a) being present in a quantity of between 1000 and 50,000 ppm; the component b) being present in a quantity of between 10 and 5000 ppm; the weight ratio of component a) to component b) varying from 1:1 to 1000:1, the component c) being present in a quantity of from 5 to 500 moles per gram atom of component b); the composition having a pH equal to or less than about 7.0, said composition having a delayed onset of gelation, sufficient to fill a high permeability zone of an oil reservoir with said composition prior to the gelation of said composition.

2. A composition as claimed in claim 1, characterised in that the water-soluble organic polymer has a weight average molecular weight of between 100,000 and 20,000,000.

3. A composition as claimed in claim 2, characterised in that said weight average molecular weight varies from 200,000 to 12,000,000.

4. A composition as claimed in claim 1, characterised in that the concentration of the water-soluble organic polymer in the composition varies from 4,000 to 30,000 ppm.

5. A composition as claimed in claim 1, characterised in that the cross-linking agent is supplied in the form of Cr(III) chlorides, nitrates or sulphates.

6. A composition as claimed in claim 1, characterised in that the concentration of said cross-linking agent in the composition varies from 25 to 500 ppm.

7. A composition as claimed in claim 1, characterised in that said ligand is chosen from glycolic acid, lactic acid, glycine, serine and 2-aminobutyric acid.

8. A composition as claimed in claim 1, characterised in that the ligand is present in the composition in a quantity of between 1 and 100 moles per gram atom of the cross-linking agent.

9. A composition as claimed in claim 1, characterised in that its pH is between about 2.0 and 7.0.

10. A method for reducing the permeability of a high-permeability zone in an oil reservoir, comprising: preparing a gellable aqueous composition as claimed in claim 1;
   injecting this prepared composition into the oil reservoir through at least one well;
   moving the composition through the reservoir until it reaches and substantially fills the high-permeability zone to be treated; and
   gelling the composition in situ with consequent lowering of the permeability of said high-permeability zone.

* * * * *